United States Patent [19]

Tennes et al.

[11] 4,064,683

[45] Dec. 27, 1977

[54] CONTINUOUS MECHANIZED HARVESTING OF HORTICULTURAL CROPS

[75] Inventors: Bernard R. Tennes, Charlotte; Clyde L. Burton, East Lansing, both of Mich.

[73] Assignee: The United States of America as represented by the Secretary of Agriculture, Washington, D.C.

[21] Appl. No.: 686,423

[22] Filed: May 14, 1976

[51] Int. Cl.² ........................................... A01D 46/00
[52] U.S. Cl. ............................................... 56/328 TS
[58] Field of Search .................. 56/1, 328 R, 328 TS, 56/329

[56] References Cited

U.S. PATENT DOCUMENTS

| | | | |
|---|---|---|---|
| 3,563,825 | 2/1971 | Gould et al. | 56/328 TS |
| 3,584,446 | 6/1971 | Bernshausen | 56/328 TS |
| 3,771,301 | 11/1973 | Favor | 56/328 TS |
| 3,793,815 | 2/1974 | Hughes | 56/328 TS |

Primary Examiner—Russell R. Kinsey
Attorney, Agent, or Firm—M. Howard Silverstein; David G. McConnell; Curtis P. Ribando

[57] ABSTRACT

A system has been devised comprising a novel method and apparatus for the harvesting of horticultural crops. The system utilizes an over-the-row harvester which employs a novel mechanical shaker and handling mechanism for continuous, nonstop operation.

6 Claims, 8 Drawing Figures

CONTINUOUS MECHANIZED HARVESTING OF HORTICULTURAL CROPS

CROSS-REFERENCES TO RELATED APPLICATIONS

This application is related to copending application Ser. No. 686424, filed concurrently herewith, now U.S. Pat. No. 4,030,244.

BACKGROUND OF THE INVENTION

The field of this invention relates to the mechanized harvesting of horticultural crops. Of particular interest is the harvesting of fruit from fully dwarfed and semidwarf trees, and especially apple trees grown in hedgerow orchards.

The recent trend in orchard plantings has been toward the smaller varieties of trees. With the fully dwarfed and semidwarf trees, higher yields per acre are possible. They also lend themselves to rapid harvesting methods, particularly for mechanized systems. Another advantage lies in their ability to bear fruit in the first year of growth. This reduces the nonproductive time of a newly established orchard, and permits the grower to rapidly change from one variety of fruit to another as market demands dictate. Moreover, during the harvesting operation, the shorter distance the fruit drops lessens the likelihood of damage. This increases the overall quality of the fruit and the yield for fresh market use.

The trend in orchard planting has also been toward the hedgerow or tree wall concept. It is recognized by Arnold G. Berlage et al. ("Modifying Tree Fruit Culture to Engineering Needs," ASAE Presentation, Spokane, Washington, Oct. 18–20, 1967) that with regard to machine operation, straight line continuous motion is simplest and most efficient. This suggests that the ideal orchard should provide a continuous or unbroken fruiting surface to the harvesting machine. It has also been observed that if the foliage thickness of each row of trees is maintained no more than 5 to 6 feet, then the yield per acre and the harvestability of the fruit is maximized.

The importance of designing orchards for mechanical harvesting is the result of rapidly rising costs of field labor. Harvesting some fruits requires more hand labor than all the other growing operations combined, and thus has the most significant effect on the production costs. Mechanical harvesters could reduce these costs. Moreover, they are more reliable, give a fairly constant output, and can be operated in varying weather conditions. These factors are important as they allow the harvesting of the fruit at optimum maturity.

Since the advent of the mechanical fruit harvester, a variety of systems and designs have been developed. Many are discussed in "Mechanical Harvesting and Handling for Apples," Everett D. Markwardt et al. (ASAE Presentation, Technical Seminar on Implications or Mechanization for Fruit and Vegetable Harvesting, Chicago, Illinois, Dec. 8–10, 1968). Most devices were designed for use on standard-sized fruit trees and employ the shake-catch method. In this operation, the fruit is removed by a mechanical shaker clamped on the trunk or one of the scaffold limbs of the tree. It is then caught below on a catch frame.

The most popular shakers are of the inertia type and the impact type. These are described in detail in "Mechanical Harvesting Equipment for Deciduous Tree Fruits," R. B. Fridley and P. A. Adrian (California Agricultural Experiment Station Bulletin 825, University of California, Davis, July 1966). The basic principle of the inertia shaker is the transmission to the tree of reactive forces developed by an oscillating mass attached to the tree. In the impact type, a padded head in one end of a tube is pushed against a limb by a piston accelerated up the tube by compressed air. Both have proven effective to varying degrees and are usually mounted on a hydraulically operated boom affixed to a tractor or to the catching frame itself. In operation, the tractor is driven up to the tree and stopped; the shaker is maneuvered into position, clamped to the tree, and activated; after the fruit is collected, the shaker is removed from the tree and advanced to the next.

A wide variety of catching frames have been used with these shakers. Their purpose is to cushion the fall of the fruit to minimize bruising. They are normally made of a durable fabric, such as canvas, and have sloping deflector wings to move the fruit to a conveyor for transport to pallet boxes. Most are mobile and comprise two opposing sections which overlap when positioned under the tree from either side. In one embodiment, the entire canvas collecting area is covered with multiple tiers of decelerating strips. These strips minimize bruising by protecting fruit already on the canvas. Millier et al. (ASAE Paper No. 72-651, ASAE, St. Joseph, Missouri, 1972) teaches an air-bag catching surface. It utilizes a multilevel catching finger unit that extends into the trees and is inflated before the tree is shaken. Another type operates in conjunction with a high velocity air stream to float the fruit down to the catching device.

Catch frames are generally designed to channel the fallen fruit either directly into pallet boxes or to conveyors for conducting the fruit to the boxes. When the boxes are filled, they are replaced with empty ones and are eventually fork-lifted from the orchard.

Disadvantages of the standard shake-catch method are numerous, particularly when operated in modern hedgerow orchards where the tree density is 5–10 times that of the standard tree orchards. The discontinuity of the process as described above is time-consuming and inefficient. It normally takes 5–10 minutes to harvest a single tree. The large size of the shaker head makes it difficult to attach it to the tree trunk either above or below the catching frame. The frames themselves are bulky and difficult to maneuver in the narrow aisles. The slope of the deflector sings required for positive movement of the fruit to the conveyor and boxes often results in the outer edge of the frame being quite high off the ground and interfering with lower limbs. Pruning of these limbs reduce productivity of the tree. Moreover, transferring of the fruit from the catching frame to the pallet boxes results in further bruising and marked reduction in fruit quality. Exchanging the filled pallet boxes for empty ones and maneuvering the filled boxes in the narrow aisles for removal from the orchard have proven to be difficult and time-consuming. Finally, repair and maintainance of the pallet boxes is very costly.

Various sytems were designed specifically for harvesting in hedgerow orchards and eliminated some of the shake-catch deficiencies. Berlage et; a. (ASAE Paper No. 74-1522, ASAE, St. Joseph, Missouri, 1974) experimented with an over-the-row harvester equipped with a tree canopy. In operation, the canopy was enclosed and filled with plastic foam spheres to prevent bruising during the detaching and collecting of the fruit. The apples were harvested with a conventional trunk shaker, and the fruit and plastic foam spheres were separated. The concept required stopping, filling, collecting, and separating at each tree. Tests indicated that the time could be speeded up by eliminating the use of the spheres with not much sacrifice in the fruit quality. However, the discontinuity required in positioning the shaker on each tree, and the problem of dealing with the filled pallet boxes, still rendered the operation very inefficient.

In an attempt to device a continuous system, Tennes ("Evaluation of a Mechanical Over-the-Row Fruit Harvester," sponsored by Koehring Company, Harvey Harvester Division, 17237 Van Wagoner Road, Spring Lake, Michigan) tested in blueberry harvester on fruit trees. The machine employed a pair of rotating heads, each having 48 protruding "fingers" or tines for beating the foliage and knocking off the fruit. However, damage to the fruit, limbs, and bark of the trees was considerable. Lower rotation speeds lessened the damage and also the effectiveness of fruit removal. Other experimental systems for continuous harvesting from hedgerow trees are the pulsating air blast technique and the trellis wire method. The air blast system is described by Berlage et al. (ASAE Paper No. 74-1522, supra) and operates on the principle of knocking the fruit from the trees by pulsating jets of air. The air generating system is conveniently mounted in a straddle harvester equipped with a catching frame. In the trellis wire system, the trees are trained on a trellis wire similar to that for grape vines. The fruit is removed by shaking the wire and catching the fruit on a collecting surface below. These systems have also proven to be relatively ineffective for high yield removal and still suffer from the problems associated with pallet boxes.

SUMMARY OF THE INVENTION

The instant invention provides a continuous mechanized system for harvesting horticultural crops. It combines a novel mechanical shaker device and a novel handling device in an over-the-row power frame. The devices operate in conjunction with one another to harvest the crops in a single, continuous, nonstop pass of the power frame.

It is an object of the instant invention to provide a system for mechanically harvesting crops in an efficient, continuous process.

It is another object of the invention to provide a novel mechanical shaker apparatus and a novel crop handling apparatus which operate conjointly during continuous advancement through the crop plants.

It is a further object of the invention to provide a continuous mechanical harvester system which minimizes bruising and other crop damage.

It is another object of the instant to provide a mechanical harvester which is especially adapted for crops grown on fully drarfed or semidwarf trees grown in hedgerows.

It is still a further object of the invention to provide a continuous mechanical harvesting system which eliminates bulky catch frames and the handling of pallet boxes.

It is fully an object of the present invention to provide a mechanical shaker and a crop handling system mobilized by a conventional over-the-row power frame which can be readily converted to other horticultural functions including planting, spraying, fertilizing, pruning, and plant removal.

These and other objects and advantages of the invention will become apparent from the description which follows and from the accompanying drawings.

DESCRIPTION OF THE PREFERRED EMBODIMENT

The continuous mechanized system of the instant invention has application for all types of horticultural crops, or fruits, which can be harvested by shaking the plants upon which they grow. The terms "crops" and "fruits" as used throughout the disclosure are defined herein in their broadest sense to include any product of plant growth useful to man or animals. Of particular interest are crops grown on fully dwarfed or semidwarf trees grown in hedgerows. Examples without limitation thereto are apples, pears, peaches, nectarines, plums, cherries, blueberries, nuts, pine cones, and others. Apple harvestingis anticipated as the most promising application.

It is to be understood that the term "continuous" as used throughout the disclosure means "without cessation." The system as a whole is continuous in the sense that the forward motion of the apparatus does not cease as it passes along the plant rows during the harvesting operations. However, it is within the scope of the invention that the system, or any component thereof, may be operated in a noncontinuous manner is so desired.

Figure 1:
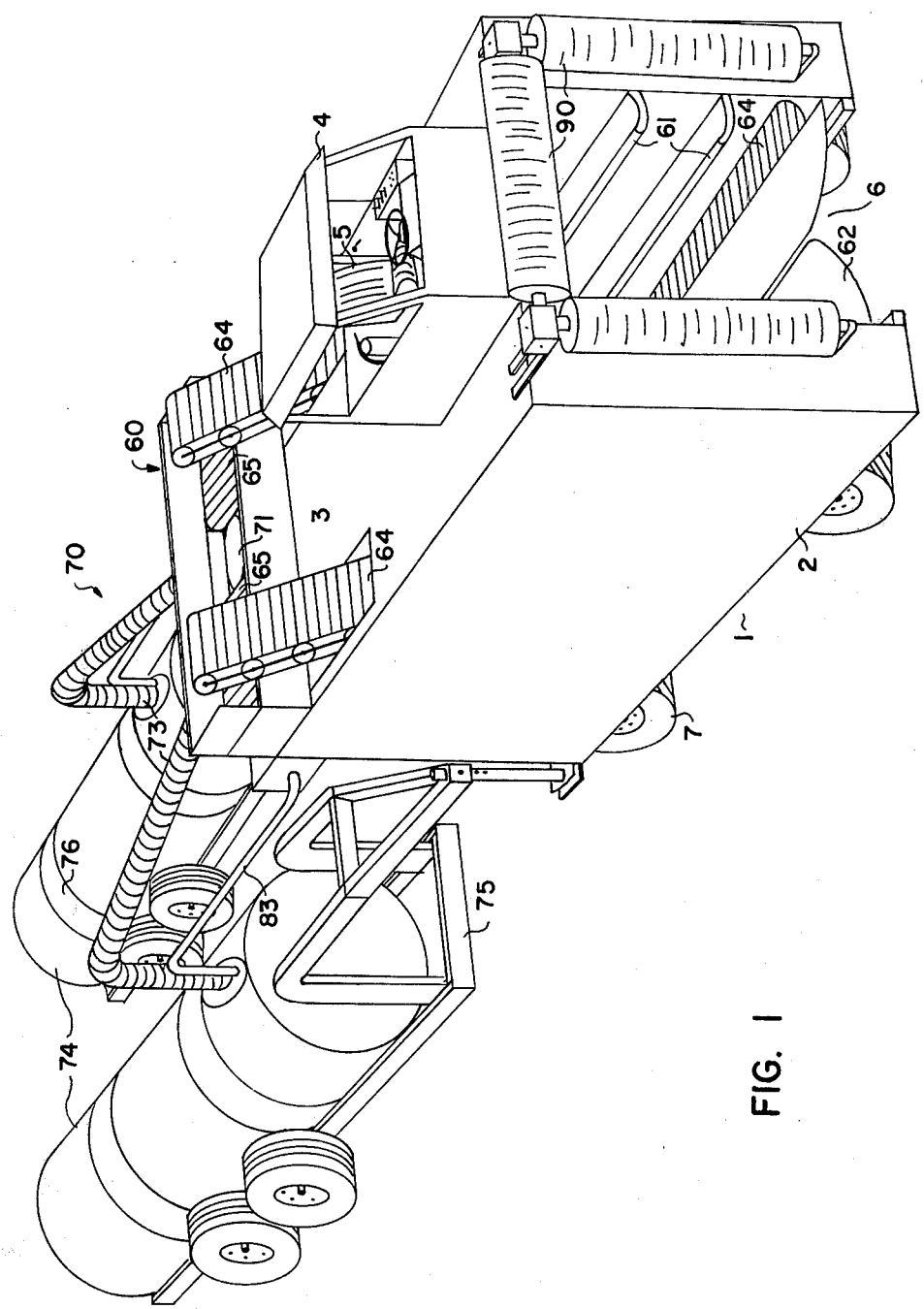
FIG. 1 is a perspective view of the continuous harvesting system of the instant invention.
Figure 2:
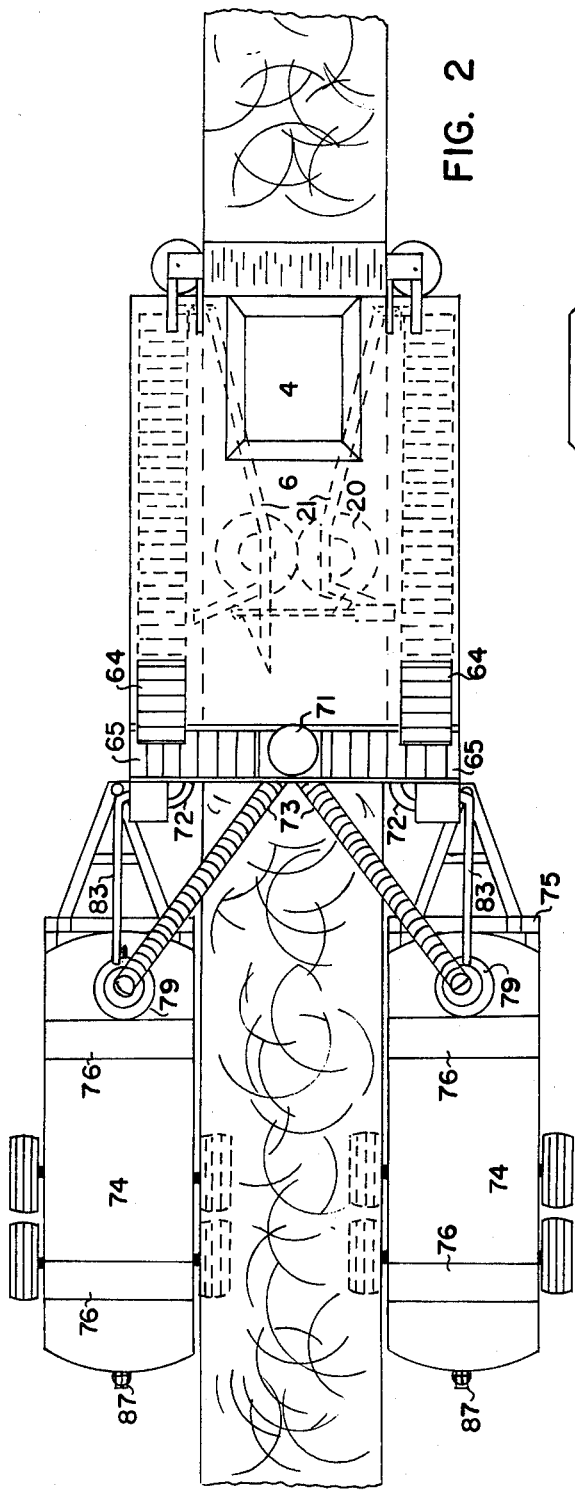
FIG. 2 is a top-plan view in partial phantom of the continuous harvesting system shown in FIG. 1.
Figure 3:
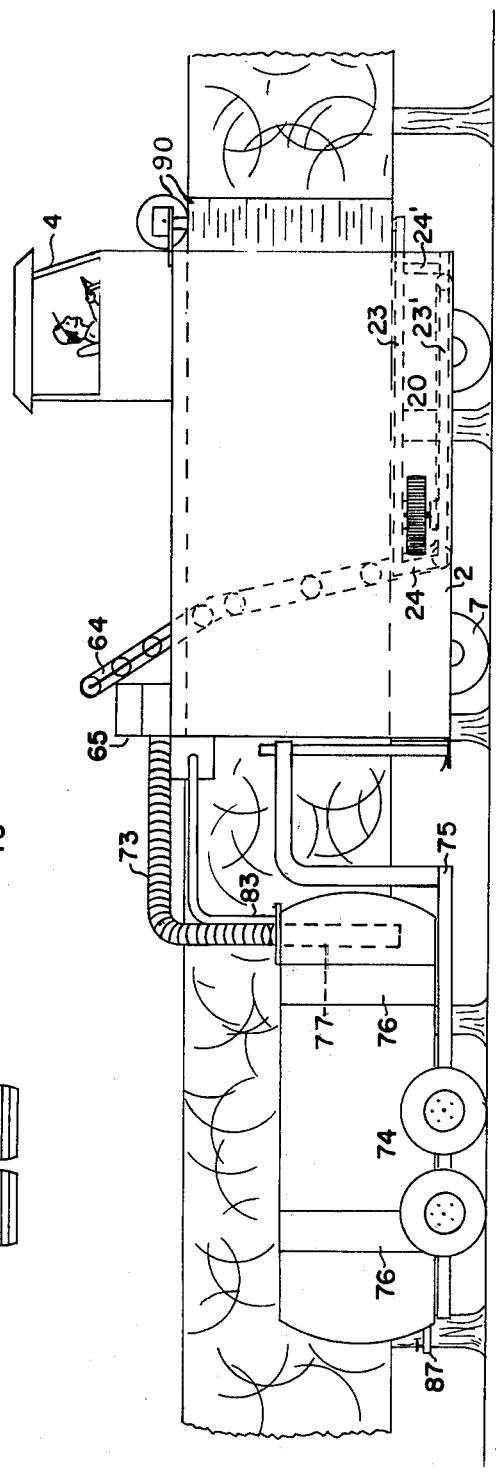
FIG. 3 is a side elevation view in a partial phantom of the continuous harvesting system shown in FIG. 1.

In referring to FIGS. 1-3, the novel shaker and handling apparatus are mobilized by a conventional self-propelled, over-the-row type power frame 1. The frame itself does not constitute part of the invention and will be described only to the extent necessary for an understanding of how it cooperates with the novel components. The frame basically comprise vertical sides 2 interconnected across the top 3 to enclose the treatment zone 6. The sides are not interconnected at the bottom in order to permit unencumbered passage of the f;rame over a row of crop-bearing plants. The frame includes roof enclosure 4 which houses the operator's seat 5, and is powered by a motor and gearing mechanism (not shown) for driving the transport wheels 7. The genral design of the power frame permits its adaptation to other horticultural functions including planting, spraying, fertilizing, pruning, and plant removal. The components for each operation can be designed for ready attachment, permitting rapid conversion between functions. This versatility enhances the economic attractiveness of the instant shaker and handling devic;es.

The power frame is additionally equipped with continuous mechanical shaker assembly 20 and a handling system. The major components of the handling system include a conveyor system generally indicated by numeral 60 and a fluid transferring system generally indicated by numeral.

Figure 4:
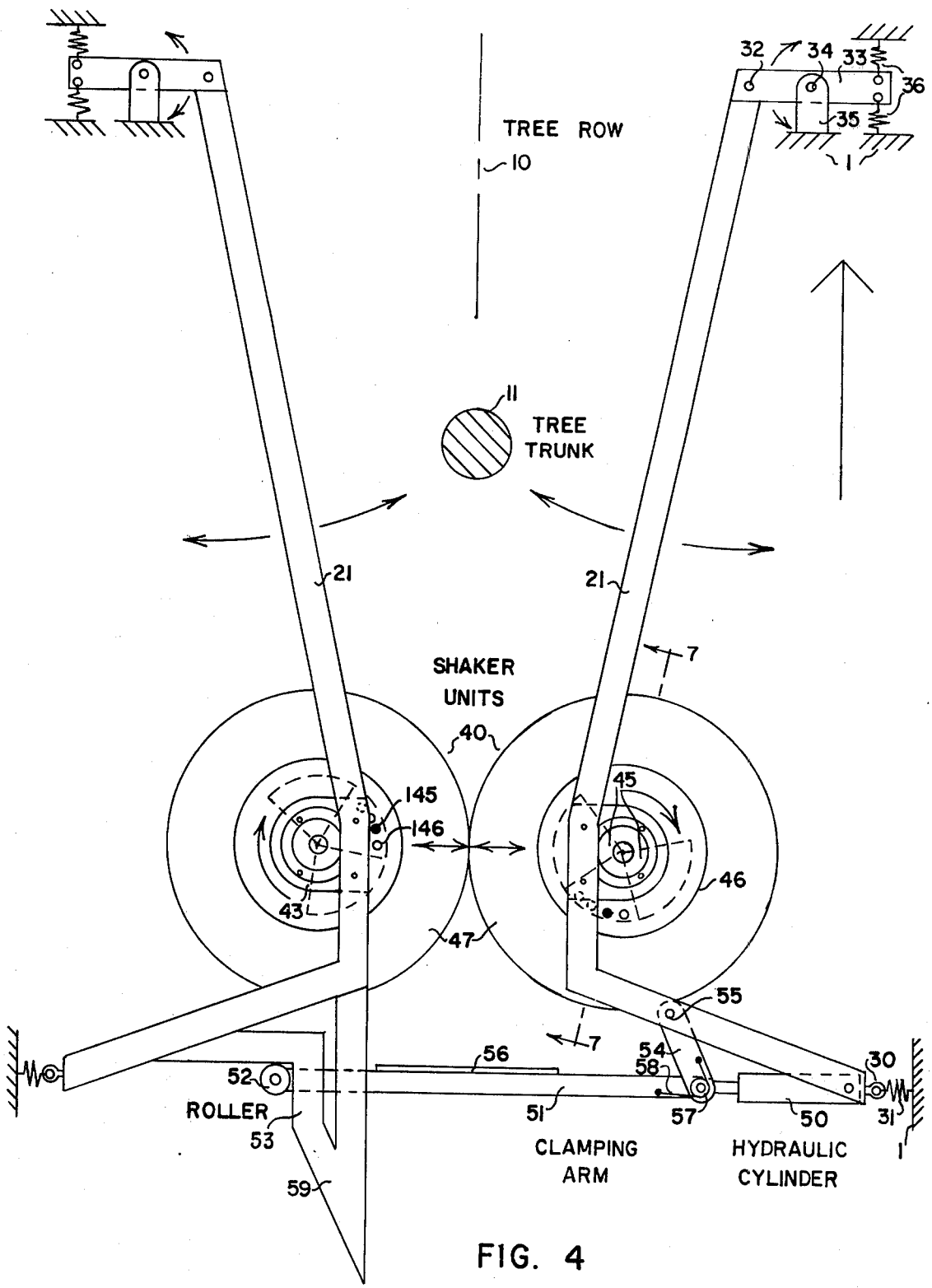
FIG. 4 is a top-plan view of the mechanical shaker device of the harvesting system in the tree-approach position.

As illustrated in FIGS. 2 and 3, the shaker assembly is mounted in the treatment zone 6 at a level to contact the tree trunks below the lowermost limbs. It comprises a pair of supporting frames 21, each having upper tubular member 23 and lower tubular member 23' (FIG. 3). The upper and lower members of each supporting frame are rigidly secured to one another by vertical connecting member 24 and 24' (FIG. 3). Each upper and lower member is secured in like fashion to power frame 1 by means of eyelet 30 and dampening spring 31 as illustrated for the upper members in FIGS. 4–6. Moreover, each upper and lower member is pivotally secured in like fashion at point 32 to one end of vibration absorbing bar 33. In turn, each bar is pivotally mounted at point 34 to an extension 35 of power frame 1. Bars 33 cooperate with dampening springs 36 and 31 to absorb vibrations from the shaker assembly which would otherwise be transmitted to the frame. The pivoting action at points 32 and 34 accomodates variations in the tree position relative to the shaking assembly as the harvesting frame moves along the row of trees 10.

Figure 7:
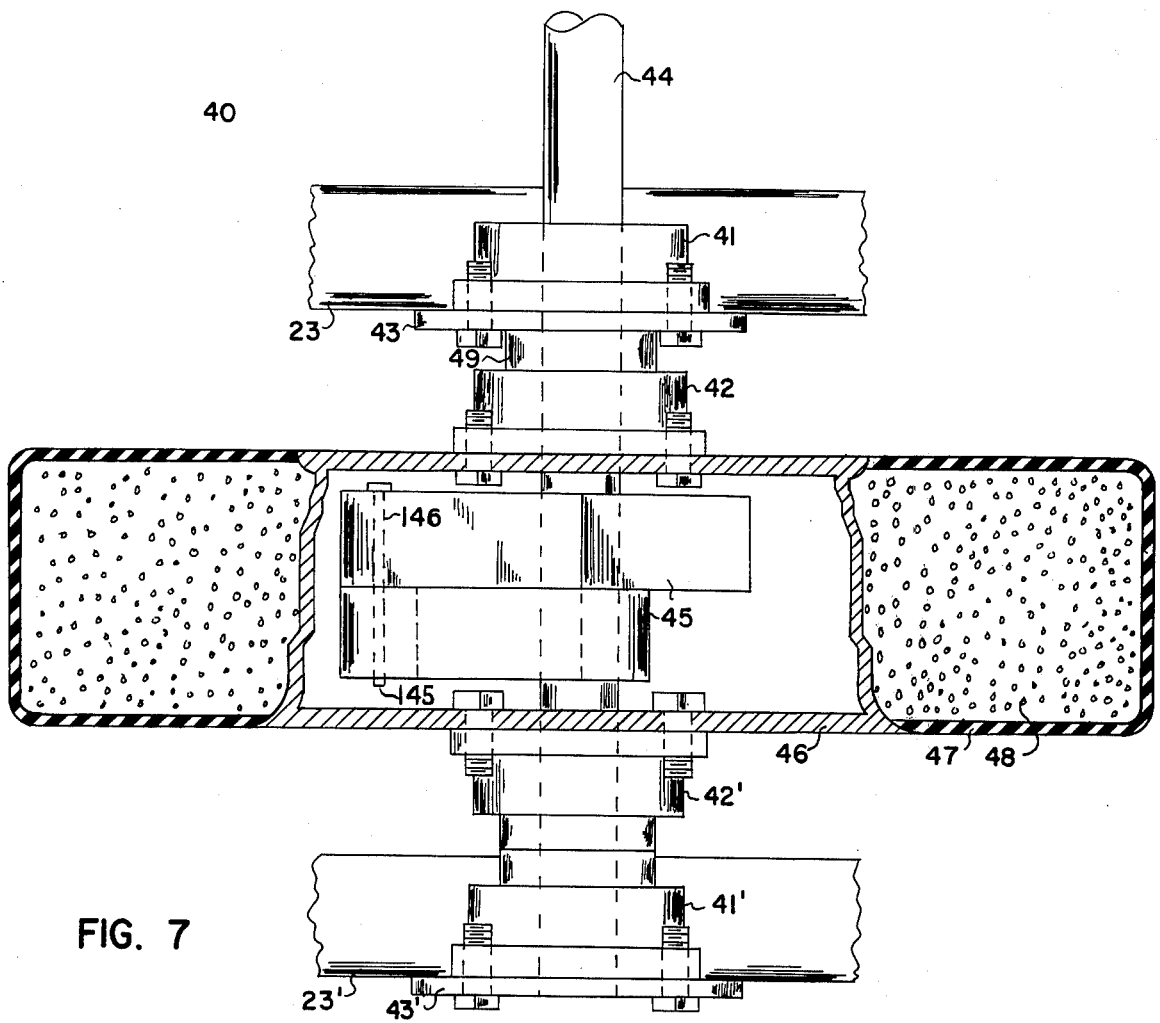
FIG. 7 is a detail side view in partial section of one of the shaking units taken along lines 7—7 of FIG. 4.

The shaking force is generated by a pair of shaking units 40, one of which is illustrated in detail in FIG. 7. Each unit comprises four bearings 41, 41', 42, and 42'. Secur;ed to bearings 41 and 41' are plates 43 and 43', respectively, for attachment of the unit to tubular assembly frame members 23 and 23', respectively. Shaft 44 passes through all four bearings and is driven by a hydraulic motor (not shown). Spacers 49 are provided for positioning bearings 42 and 42' on shaft 44. Offset inertial weights 45 are situated within the interior of shaker pad supporting means 46. One of the weights is drivably integrated with shaft 44, and the other is secured to the first by pin 145 passing through a pair of adjustment holes 146. The shaker 47 which is rigidly secured to the support means is made of a flexible resilient material which can conform to the shape of the trunk 11, and transmit the vibrations produced by shaker unit to the trunk without damaging it. In the preferred embodimen depicted in FIG. 7, the pad 47 is an automobile tire filled with nut shells 48 and the supporting means 46 is a tire rim. The pad 47 and supporting means 46 are secured to bearings 42 and 42' for free rotation on shaft 44. The pads tend to rotate in the direction of the inertial weight rotation, despite the fact that they are not directly driven. This rotation can cause abrasion of the tree bark upon initial contact by the pad. It is therefore preferred to rotate the inertial weights in opposite directions in order for the corresponding rotational motions of the pads to cancel one another. This results in zero relative velocity between the pads and tree trunk at the time of initial contact.

As the shaker units 40 approach the tree 11 (FIG. 4), the pads 47 are held in contact with one another by the action of the hydraulic cylinder 50. The cylinder 50 supplies the desired constant tension between right and left frames 21 through clamping arm 51, roller means 52, and brace 53. Adjustable hydraulic relief pressure settings for cylinder 50 permit selection of clamping pressure for different trunk sizes.

Figure 5:
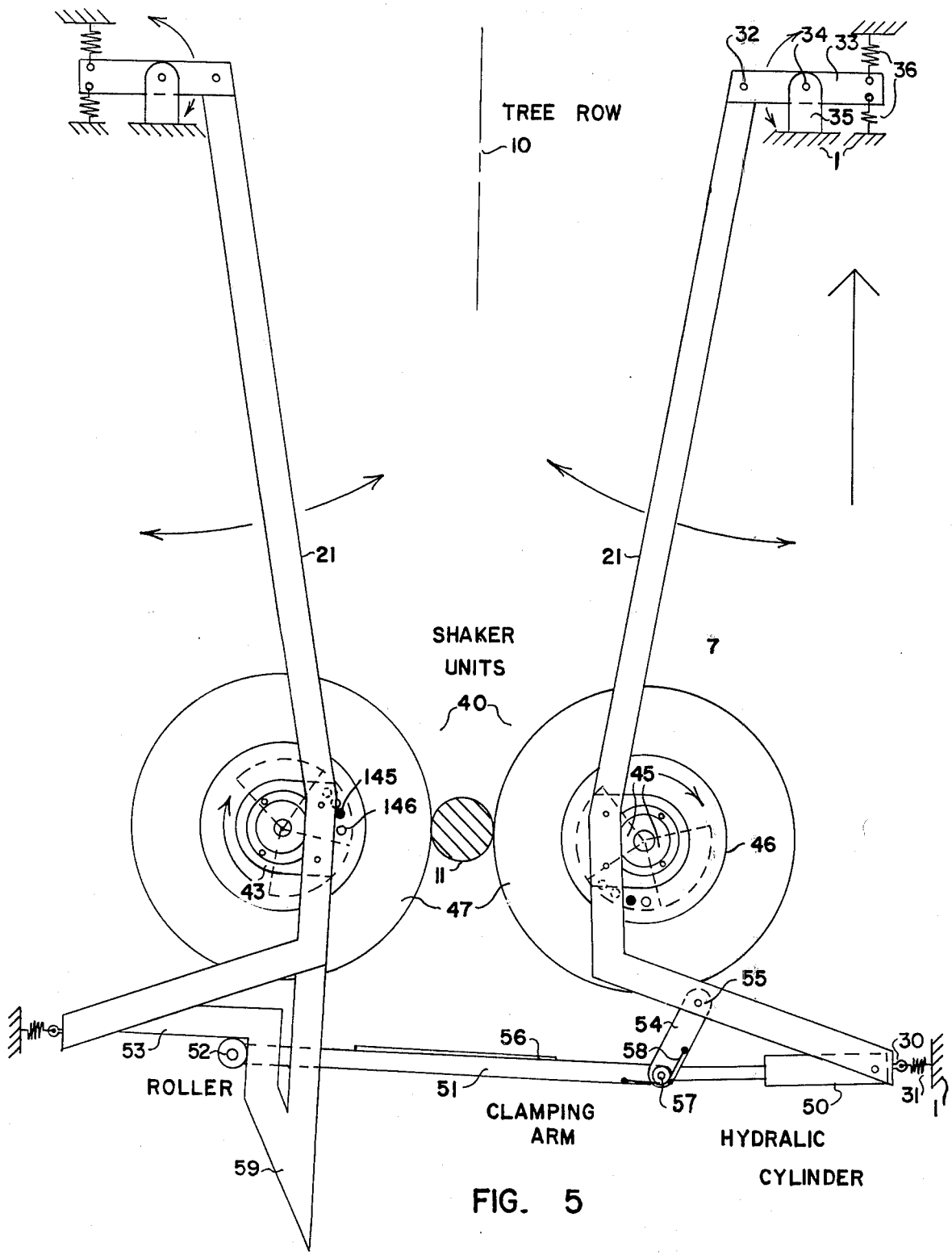
FIG. 5 is a top-plan view of the mechanical shaker device of the harvesting system in the tree-locked position.

When the pads 47 contact the tree, the expansion of the cylinder and pivoting action of bar 54 at point 55 permits the tree to pass between the pads as shown in FIG. 5. In this position, the trunk is subjected to a combination of interial forces transmitted through the pads as vibrational motion. The magnitude and frequency of the forces generated may be adjusted by varying the position of the weights 45 relative to one another by means of pin 145 and adjustment holes 146, or by varying the oil flow to the hydraulic motors driving the weights.

Figure 6:
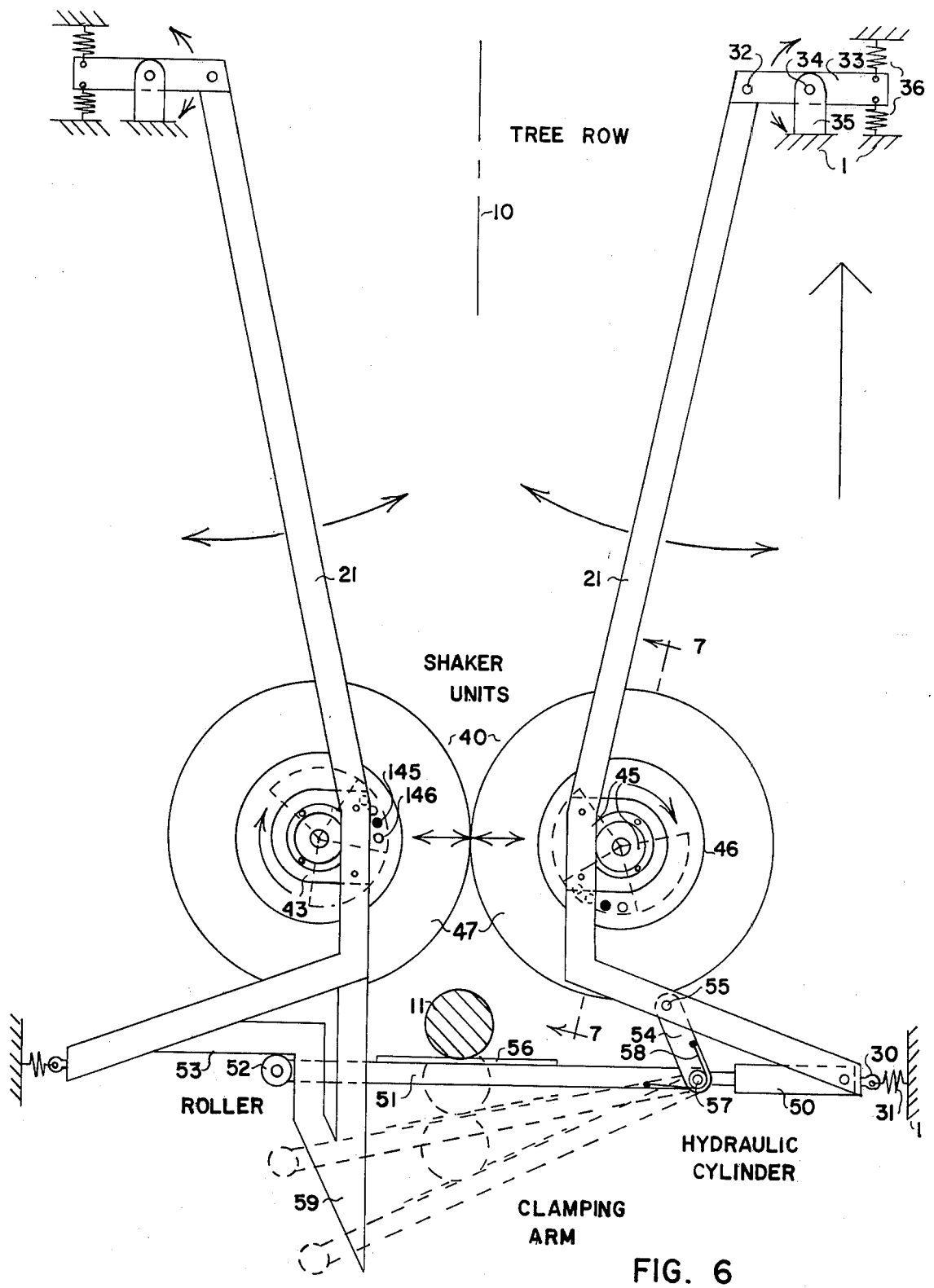
FIG. 6 is a top-plan view of the mechanical shaker device of the harvesting system in the tree-release position.
Figure 8:
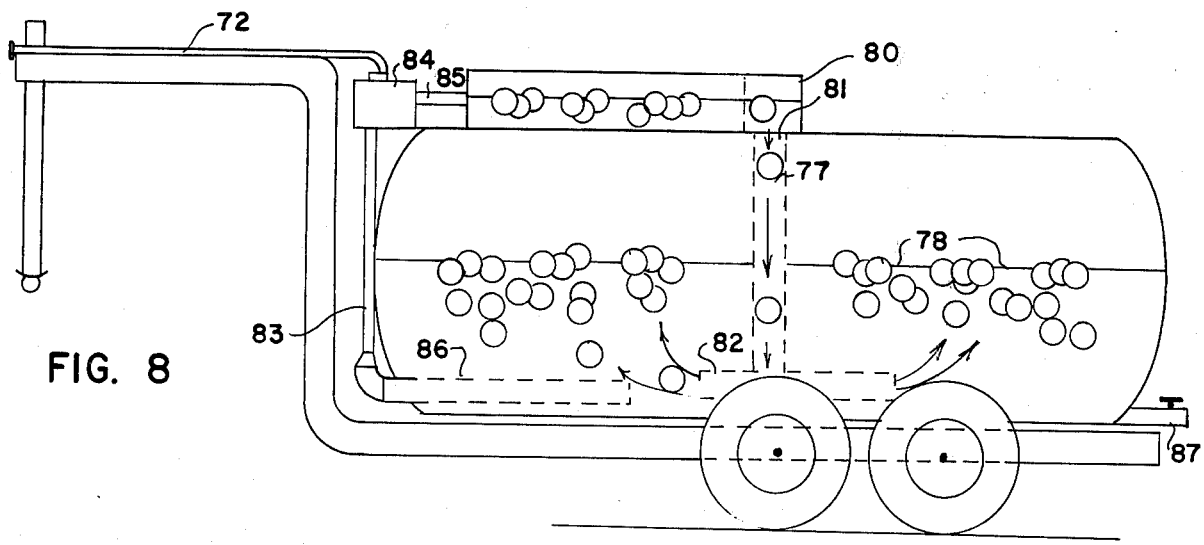
FIG. 8 is a detail side view in partial phantom of one of the holding tanks.

As the harvesting machine advances, the trunk is released by the pads which again are drawn together by the action of hydraulic cylinder 50 (FIG. 6). The tree is then contacted by clamping arm 51 which is preferably provided with a pad 56 composed of a material such as "Teflon" to prevent damaging of the bark. As the machine continues forward, the clamping arm pivots on point 57 and rolls out of its clamping position by means of roller 52. The arm continues to swing to teh rear until the tree is released from the shaker assembly. It is then returned to its clamping position by a coil spring assembly 58 and by guiding track 59. Roller 52 not only assures smooth operation but also prevents any possibility of the clamping arm jamming on release. Referring back to FIGS. 1–3, the fruit shaken from the trees falls onto shelf catch frames 61 and the lower catch frames 62 which are constructed of a cushioning material such as canvas. The catch frames slope for movement of the fruit to sloping conveyors 64. It is thereby transferred to horizontal transverse conveyors 65 which feed into central flume hopper 71. The hopper is also fed by line 72 which supplies it with a transfer medium. Water is the most convenient medium, though brine or other suitable liquid can be used. The medium carries the apples from the hopper through a tube 73 to one or more holding tanks 74. The tanks are preferably constructed of a noncorrosive material such as aluminum, stainless steel, or plastic, and are secured to trailers 75 and 76. They are kept partially filled with the transfer medium and are equipped with vertical pipe 77 opening to the interior of the tank below the surface level 78 of the medium (see FIG. 8). In one embodiment illustrated in FIGS. 2 and 3, each tube 73 feeds directly into vertical pipe 77 by means of quick attachment coupling 79. As an alternative, the top of the tank is provided with its own flume 80 into which the apples and transfer medium can be deposited from tube 73 (see FIG. 8). They then flow into opening 81 and down vertical pipe 77. In either system, horizontal pipe 82 helps to distribute the apples in the tank. Each tank is also provided with a recirculating line 83 for the transfer medium. In the embodiment of FIG. 8, the line leads into recirculating pump 84 and distributes the medium between flume 80 by means of line 85 and flume hopper 71 by means of line 72. In the embodiment of FIG. 1, the pump 84 may be placed on the power frame itself. The pump is protected f;rom foreign material by cylindrical screen 86. The perforations in screen 86 should be small enough so that smaller fruits such as cherries cannot flow through or be damaged by the pump attempting to "pull" them through the screen.

The system is continuous flow. The transfer medium is used to cushion the fruit and essentially reduce any brusing normally incurred in prior art handling processes, such as in the pellet box systems. Fruit having a density lower than the transfer medium can be conveniently removed from the tank by flotation. A nozzle 87 is provided for introducing the flotation medium, which is usually the same as the transfer medium. Vertical pipe 77 is designed for easy removal to facilitate flotation through opening 81. High density fruit which sinks to the bottom of the transfer medium can be flushed out from the top through discharge nozzle 87.

To minimize damage to the foliage entering the harvesting zone 6, the sides and top of the power frame are equipped with rollers 90 (FIGS. 1-3). The rollers are preferably made of a soft spongy-type material and are mounted for free rotation upon their axes. In operation, they frictionally engage with the foliage as the power frame advances, thereby rotating and introducing the foliage into the harvesting zone.

OPERATION OF THE PREFERRED EMBODIMENT

In the preferred operation of the invention, the power frame is equipped with the shaker assembly 20 and two tanks 74, one for either side of the row as depicted in FIGS. 1-3. As the frame approaches the hedgerow, the rollers 90 frictionally engage with the foliage and rotate in a direction which assists the introduction of the foliage into harvesting zone 6. The leading edges of the rollers rotate toward the median line of the zone. The action of the hydrualic cylinder 50 forces pads 47 into light frictional engagement with one another. The inertial weights 45 in the paired shaker units 40 are rotated in opposite directions and the corresponding rotational tendencies of the pads are thereby cancelled. In this state, the manifestation of the vibrational forces is minimal. As the pads contact a tree trunk, they are forced apart against the action of the hydraulic cylinder and wrap themselves around the tree. The resistance by the tree to the minimal vibrational forces caused by the inertial weights results in intensification of the forces. They are transmitted to the tree by means of the pads and are of sufficient intensity to shake the apples from the tree. As the pads advance beyond the tree, they return to their frictionally engaged and relatively quiescent state. The tree is then released from the shaker assembly through clamping arm 51 as described, supra. On the average, the entire operational takes from 6-10 seconds per tree, a vast improvement over the prior art systems.

As the apples are shaken from the limbs, their fall is cushioned by catching frames 61, 62, and they roll onto the sloping conveyors 64. Conveyors 64 transport the apples to the horizontal conveyors 65 which dump them into flume hopper 71 which is supplied with water from line 72. It is preferred to fill one holding tank at a time. In this way, when one fills up in the middle of a row, the operation can continue with the other. At the end of the row the full tank can then be placed with an empty one. To achieve this end, the flume 71 can be provided with a baffle or valve means as known in the art for directing the flow to one tube 73 or the other. An alternative system would employ a single tube mounted on a rotatable arm. The arm could powered by a conventional means, such as hydraulic cylinder, for swinging the tube from the filled tank to the empty one. The filled tanks are conveniently hauled to a storage silo or processing plant and empties as described above.

It is to be understood that the foregoing detailed description is given merely by way of llustration and that modification and variatios may be made therein without departing from the spirit and scope of the invention.

We claim:

1. A mechanical shaker assembly apparatus adapted for attachment to a power frame for continuous harvesting of horticultural fruits comprising:
   a first supporting frame means and a second supporting frame means;
   a shaker unit secured to each of said first and said second supporting frame means, each of said shaker units comprising a shaker pad, a shaker pad supporting means, a motor-driven rotatable shaft, a first set of bearing means and a second set of bearing means, said pad supporting means and said supporting frame means being journalled to said shaft by said first and second sets of bearing means, respectively, said shaker unit further comprising at least one offset inertial weight secured to said shaft for rotation therewith; and
   a means secured to said first supporting frame means for forcing each of said shaker unit pads into frictional engagement with the other of said pads, said forcing means equipped with an expansion means to permit passage of plant trunks between said frictionally engaged pads.

2. The apparatus defined in claim 1 wherein each of said first and second supporting frame means comprises an upper tubular member and a lower tubular member secured to one another at each end by a vertical connecting member.

3. The apparatus defined in claim 1 wherein said at least one offset inertial weight comprises a first and second weight, one positioned immediately above the other on said shaft and each having a plurality of adjustment holes bored therethrough in parallel alignment with said shaft, and all of said holes radially spaced from said shaft an equal distance, said first inertial weight being drivably integrated with said shaft, and said second inertial weight slidably affixed to said shaft and coupled to said first inertial weight by a removable pin passing through one of siad plurality of holes in each of said weights.

4. The apparatus defined in claim 1:
   wherein said shaker pads are automobile tires filled with nut shells; and
   wherein said shaker pad supporting means are automobile tire rims.

5. The apparatus defined in claim 1 wherein said forcing means comprises:
   a rigid clamping arm having one end coupled to said first supporting frame means through said expansion means, said clamping arm and said expansion means pivotally secured to said first supporting frame means to permit release of said trunks from said mechanical shaker assembly;
   a roller securedly affixed to the other end of said clamping arm; and
   a brace rigidly affixed to said second supporting frame means;
   said roller and said brace positoned to act upon one another to resist separation of said first and said second supporting frame means and their respective secured shaker units from one another.

6. The apparatus defined in claim 5 wherein said expansion means comprises a hydraulic cylinder.

* * * * *